United States Patent [19]
Nomura et al.
[11] Patent Number: 4,541,788
[45] Date of Patent: Sep. 17, 1985

[54] DIAPHRAGM FLUID PUMP

[75] Inventors: Yoshihisa Nomura; Shingo Watanabe, both of Toyota; Shoichi Yamamoto, Oobu, all of Japan

[73] Assignees: Toyota Jidosha Kabushiki Kaisha, Toyota; Aisan Kogyo Kabushiki Kaisha, Oobu, both of Japan

[21] Appl. No.: 599,819

[22] Filed: Apr. 13, 1984

[30] Foreign Application Priority Data

Apr. 19, 1983 [JP] Japan ................................ 58-068818

[51] Int. Cl.[4] ............................ F04B 43/02; F16J 1/10
[52] U.S. Cl. ...................................... 417/471; 417/129
[58] Field of Search .................. 417/470, 471; 92/129, 92/100

[56] References Cited

U.S. PATENT DOCUMENTS

| | | | |
|---|---|---|---|
| 2,028,371 | 1/1936 | Wiltse | 92/100 |
| 2,044,957 | 6/1936 | Strebler | 92/129 |
| 2,359,960 | 10/1944 | Anderson | 92/120 |
| 2,687,696 | 8/1954 | Theis | 92/100 |
| 2,859,701 | 11/1958 | Williams | 92/100 |
| 3,035,676 | 5/1962 | Nallinger | 417/470 |
| 3,999,899 | 12/1976 | Sakai | 92/129 |

FOREIGN PATENT DOCUMENTS

| | | | |
|---|---|---|---|
| 418977 | 10/1934 | United Kingdom | 417/471 |
| 1571360 | 7/1980 | United Kingdom | 417/471 |

*Primary Examiner*—William L. Freeh
*Attorney, Agent, or Firm*—Oblon, Fisher, Spivak, McClelland & Maier

[57] ABSTRACT

In a diaphragm fluid pump which includes a diaphragm piston assembly assembled within a pump housing to form a pump chamber at one side thereof, the diaphragm piston assembly includes a diaphragm member secured in a fluid-tight manner at its outer periphery to the peripheral wall of the pump housing, and an operation rod connected at one end to the diaphragm member and at another end to a swingable end of a rocker arm to reciprocate the diaphragm piston assembly in an axial direction so as to produce a positive or negative pressure in the pump chamber. A pair of axially spaced upper and lower guide assemblies are mounted within the pump housing to slidably support the operation rod in its axial direction, and a support member is mounted on a lower end portion of the operation rod and slidably supported by the lower guide assembly, the support member being provided at its upper end with a receiver portion for receiving thereon the swingable end of the rocker arm.

10 Claims, 4 Drawing Figures

DIAPHRAGM FLUID PUMP

BACKGROUND OF THE INVENTION

The present invention relates to a diaphragm fluid pump, and more particularly to a diaphragm fluid pump which is used as a vacuum pump, a fuel pump or the like.

A conventional diaphragm fluid pump of this kind includes a diaphragm piston assembly assembled within a pump housing to form a pump chamber at one side thereof, which piston assembly comprises a diaphragm member secured in a fluid-tight manner at its outer periphery to the peripheral wall of the pump housing, and an operation rod connected at its one end to the diaphragm member and at its other end to a swingable end of a rocker arm to reciprocate the diaphragm piston assembly in an axial direction so as to produce a positive or negative pressure in the pump chamber. The rocker arm is pivoted on a portion of the pump housing to swing by its engagement with a cam member on a drive shaft. In such an arrangement, the operation rod is applied with forces in its axial and radial directions during operation of the rocker arm, resulting in irregular deformation of the diaphragm member upon reciprocation of the diaphragm piston assembly. This causes a partial stress in the diaphragm member, resulting in fatigue of the diaphragm member in a short period of time. Furthermore, a dish plate is secured to the diaphragm member inside the pump chamber to fasten the operation rod in place, which dish plate swings upon reciprocation of the diaphragm piston assembly. For this reason, it is required to lower the upper dead point of the diaphragm piston a predetermined distance. This reduces the capacity of the pump chamber, resulting in decrease of the volumetric efficiency of the fluid pump.

In order to overcome the above-noted problems, it has been proposed to provide a guide portion in the pump housing for axially slidable support of the operation rod. Such an arrangement of the guide portion is intended to restrict movement of the operation rod in its axial direction to thereby prevent the diaphragm member from experiencing irregular deformation. However, the movement of the operation rod may not be restricted in its axial direction because the operation rod is guided only at one portion thereof. Furthermore, the radial force acting on the operation rod will cause wear and seizure at the guide portion.

SUMMARY OF THE INVENTION

It is, therefore, a primary object of the present invention to provide an improved diaphragm fluid pump the operation rod of which is arranged to be reliably guided in its axial direction during operation of the fluid pump.

Another object of the present invention is to provide an improved diaphragm fluid pump, having the above-mentioned characteristics, which is capable of reducing wear at a guide portion of the operation rod.

According to the present invention, the above objects are accomplished by provision of a diaphragm fluid pump wherein a pair of axially spaced upper and lower guide assemblies are mounted within the pump housing to slidably support the operation rod in its axial direction, and a support member is mounted on a lower end portion of the operation rod and is slidably coupled with the lower guide assembly, and wherein the support member includes a receiver portion receiving the swingable end of the rocker arm. With the above construction, axial movement of the operation rod is reliably guided by means of both the axially spaced guide assemblies to prevent the diaphragm member from its irregular deformation so as to enhance durability of the diaphragm piston assembly, and the upper dead point of the diaphragm piston can be raised to enhance volumetric efficiency of the fluid pump. Furthermore, the swingable end of the rocker art is radially slidably supported by the receiver portion of the support member to decrease the radial forces acting on the operation rod so as to reduce wear and seizure at the lower guide assembly.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENT

Figure 1:
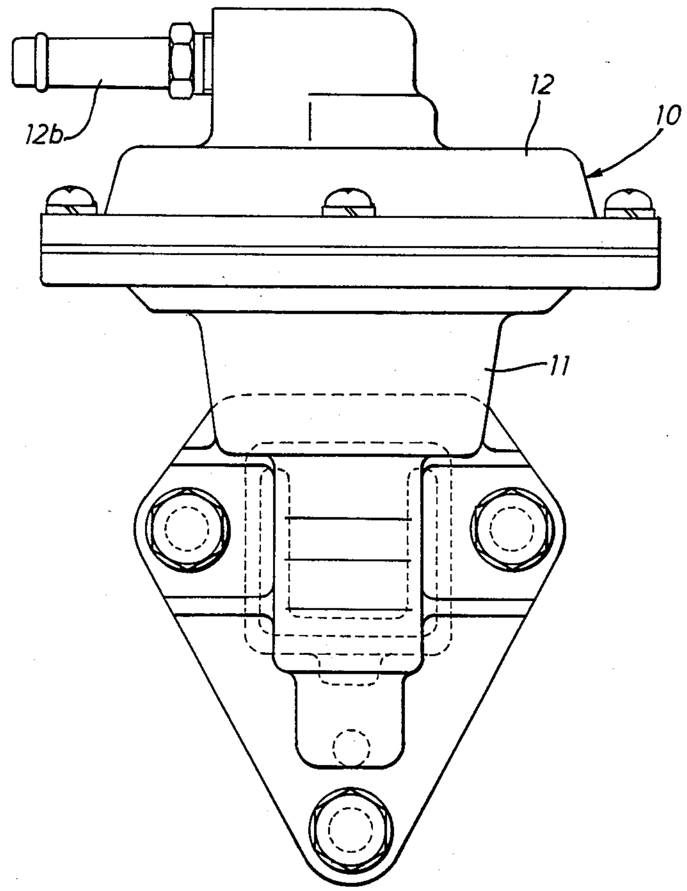
FIG. 1 is a front view of a diaphragm vacuum pump in accordance with the present invention.
Figure 2:
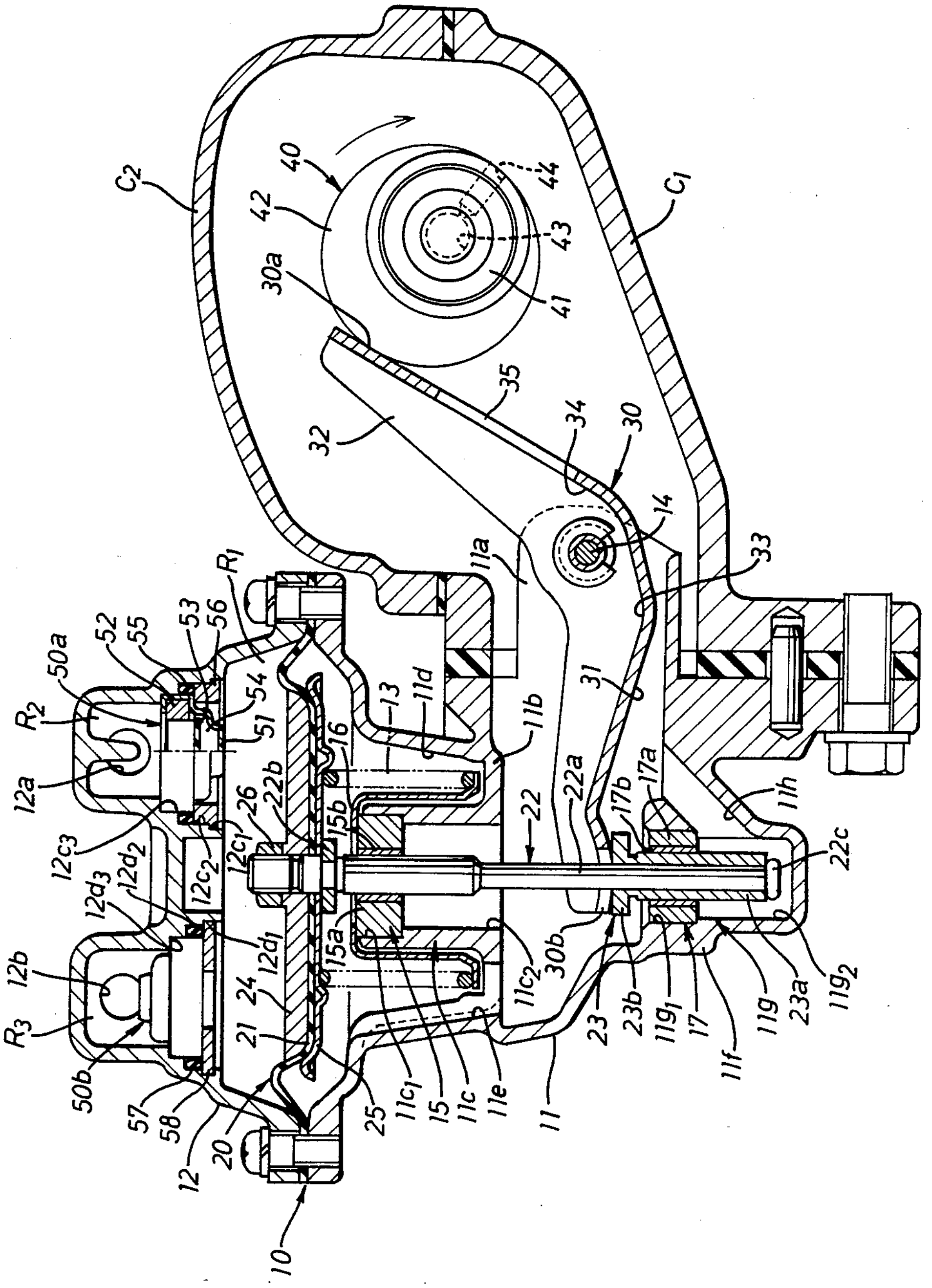
FIG. 2 is a cross-sectional view of the diaphragm vacuum pump shown in FIG. 1.

Referring now to the drawings, FIGS. 1 and 2 illustrate a preferred embodiment of a diaphragm vacuum pump in accordance with the present invention, in which a pump housing assembly 10 for the pump is mounted on a cylinder head $C_1$ and a cylinder head cover $C_2$ of an internal combustion engine located at one side of the engine, and a diaphragm piston assembly 20 is arranged in the interior of pump housing assembly 10. A rocker arm 30 and an over head cam shaft 40 of the engine are arranged within a space formed by a lower section 11 of pump housing assembly 10, the cylinder head $C_1$ and the cylinder head cover $C_2$. One end of the cam shaft 40 is provided as a pump drive shaft.

The diaphragm piston assembly 20 includes a circular diaphragm member 21, an operation rod 22 and a support sleeve member 23. The diaphragm member 21 is clamped in a fluid-tight manner at its outer periphery between fitting faces of upper and lower sections 11 and 12 of the pump housing assembly 10, which diaphragm member 21 forms a pump chamber $R_1$ at its upper side. The diaphragm member 21 is provided with a dish plate 24 fixed to its upper face and further provided with a circular spring retainer 25 fixed to its lower face. The diaphragm member 21 is clamped by the dish plate 24 and the spring retainer 25 which are fastened by an annular flange **22*b* of operation rod 22 and a nut 26 threaded to the upper end of rod 22. Thus, the operation rod 22 is integrally fixed to the center of diaphragm member 21 through dish plate 24 and retainer 25 and is slidably guided in its axial direction by means of a pair of axially spaced upper and lower guide assemblies 15 and 17. A compression coil spring 13 is assembled with the spring retainer 25 to bias the diaphragm piston assembly 20** upwardly.

The upper section 12 of pump housing 10 is formed therein with a suction chamber $R_2$ and a discharge chamber $R_3$ located above the pump chamber $R_1$. The upper section 12 of pump housing 10 has inlet and exhaust ports 12*a* and 12*b*, the former being arranged to connect the suction chamber $R_2$ to a vacuum brake booster (not shown), and the latter being arranged to connect the discharge chamber $R_3$ to the atmospheric air. The suction chamber $R_2$ is communicated via a suction check valve 50*a* with the pump chamber $R_1$, while the discharge chamber $R_3$ is communicated via a discharge check valve 50*b* with the pump chamber $R_1$.

Figure 3:
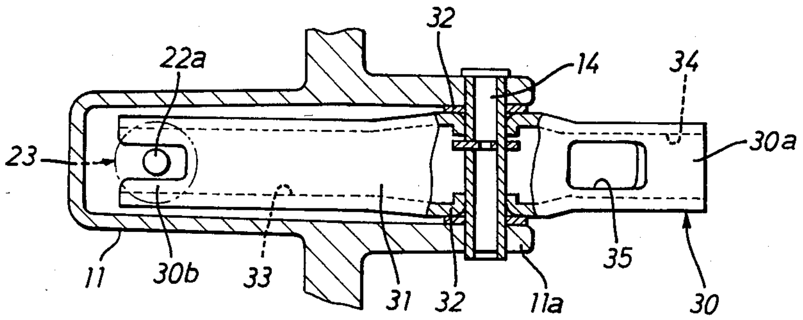
FIG. 3 is a bottom view of a rocker arm assembled in the diaphragm vacuum pump.

As can be well seen in FIGS. 2 and 3, the rocker arm 30 is made of pressed sheet metal of an approximately L-letter shape and has a bottom portion 31 of a predetermined width and a pair of side wall portions 32. Thus, the bottom portion 31 of rocker arm 30 is formed as an oil well 33, and the side wall portions 32 of rocker arm 30 are formed to provide a trough 34. The bottom portion 31 of rocker arm 30 is also formed with an opening 35 at its upper part. In such an arrangement, the rocker arm 30 is journalled at its intermediate portion by a pivot pin 14 on an arm part 11*a* of lower section 11 of pump housing assembly 10. Thus, the rocker arm 30 is swingable in a vertical plane and is engaged at its upper bottom face 30*a* with the outer periphery of an eccentric cam 42, which is integrally mounted on a portion 41 of the pump drive shaft 40. The rocker arm 30 is further formed at its swingable end with a fork portion 30*b* which is coupled with a lower portion 22*a* of operation rod 22 and received by the support sleeve 23 as will be described in detail later. The pump drive shaft 40 is provided therein with an axially drilled oil passage 43, and the eccentric cam 42 is also provided therein with a radially drilled oil passage 44 in open communication with the axial oil passage 43. The radial oil passage 44 is arranged to oppose to the opening 35 in rocker arm 30 during rotation of the pump drive shaft 40 so as to discharge lubricating oil supplied thereto through axial oil passage 43 from a source of lubricating oil by a centrifugal force.

The lower section 11 of pump housing assembly 10 is integrally formed therein with a partition wall 11*b* which includes at its center with a cylindrical portion 11*c* forming an annular cavity 11*d*. The partition wall 11*b* is formed at one side thereof with a vertical through hole 11*e*. The cylindrical portion 11*c* of partition wall 11*b* has a vertical stepped bore including a large diameter part 11$c_1$ and a small diameter part 11$c_2$. The upper guide assembly 15 is detachably coupled within the large diameter part 11$c_1$ of the vertical stepped bore and includes an outer annular bush 15*a* and an inner annular bush 15*b* coupled within the outer bush 15*a* with a press fit. A cylindrical spring retainer 16 is coupled over the cylindrical portion 11*c* of partition wall 11*b* to receive one end of the compression coil spring 13. In such an arrangement, the compression coil spring 13 is engaged at the other end thereof with the spring retainer 25 to bias the diaphragm piston assembly 20 upwardly and to resiliently retain the upper guide assembly 15 in place through the cylindrical retainer 16. Thus, the guide assembly 15 acts to reliably guide the upper portion of operation rod 22 in its axial direction.

The bottom wall 11*f* of lower housing section 11 is formed with a vertical stepped bore 11*g* which is located coaxially with the upper cylindrical portion 11*c* of partition wall 11*b*. The vertical stepped bore 11*g* has a large diameter part 11$g_1$ and a small diameter part 11$g_2$, and the lower guide assembly 17 is fixedly coupled within the large diameter part 11$g_1$ of bore 11*g* with a press fit. The lower guide assembly 17 includes an outer annular bush 17*a* and an inner annular bush 17*b* fixedly coupled within bush 17*a* with a press fit. Thus, the lower guide assembly 17 acts to reliably guide the lower portion of operation rod 22 in its axial direction. The bottom wall 11*f* of lower housing section 11 is further formed with an oil passage 11*h* opening toward the small diameter part 11$g_2$ of the stepped bore 11*g* from the inner bottom of lower housing section 11. The oil passage 11*h* leads the lubricating oil discharged from the radial passage 44 of eccentric cam 42 to the small diameter part 11$g_2$ of bore 11*g* and permits a reverse flow of the lubricating oil from the stepped bore 11*g*. This means that the small diameter part 11$g_2$ is provided as an oil well.

The operation rod 22 of diaphragm piston assembly 20 has a large diameter portion slidably supported by the inner bush 15*b* of guide assembly 15 in its axial direction, and the support sleeve 23 is rotatably mounted on the lower portion 22*a* of operation rod 22. The support sleeve 23 has a cylindrical portion 23*a* and an annular flange 23*b* integrally formed at its upper end, which support sleeve 23 is received by an enlarged lower end 22*c* of operation rod 22. The cylindrical portion 23*a* of support sleeve 23 is axially slidable and rotatable in the inner bush 17*b* of lower guide assembly 17, and the outer diameter of annular flange 23*b* is smaller than the inner diameter of the small diameter bore part 11$c_2$ of the cylindrical portion 11*c*. With such arrangements described above, the upper portion of operation rod 22 is directly guided by the inner bush 15*b* of upper guide assembly 15, while the lower portion 22*a* of operation rod 22 is guided by the inner bush 17*b* of lower guide assembly 17 through the support sleeve 23. Under the biasing force of compression coil spring 13, the fork portion 30*b* of rocker arm 30 is resiliently received by the annular flange 23*b* of support sleeve 23, while the upper rear face 30*a* of rocker arm 30 is in resilient engagement with the outer periphery of eccentric cam 42.

Both the check valves 50*a* and 50*b* are of the same construction and respectively mounted within the suction and discharge chambers R2 and R3 relatively in an opposite direction. Each of check valves 50*a*, 50*b* comprises a stepped valve casing 51, an annular valve seat member 52 fixed within a large diameter portion of casing 51, a circular valve plate 53 assembled within a medium diameter portion of casing 51 to cooperate with the valve seat member 52, and a compression coil spring 54 assembled within a small diameter portion of casing 51 to bias the valve plate 53 toward the valve seat member 52. The suction chamber $R_2$ is formed at its opening end with stepped inner walls 12$c_1$, 12$c_2$ and 12$c_3$. Thus, the valve casing 51 of suction check valve 50*a* is coupled within the stepped inner walls of chamber $R_2$ through an O-ring 55 and fastened in place by an annular retainer 56. The discharge chamber $R_3$ is also formed at its opening end with stepped inner walls 12$d_1$, 12$d_2$ and 12$d_3$. Thus, the valve casing 51 of discharge check valve 50*b* is coupled within the stepped inner walls of chamber $R_3$ through an O-ring 57 and fastened in place by an annular retainer 58.

In operation of the diaphragm vacuum pump, the pump drive shaft 40 rotates in a direction shown by an arrow in FIG. 2 in operation of the engine, and the rocker arm 30 swings by its engagement with the eccentric cam 42 in a vertical direction to reciprocate the diaphragm piston assembly 20. In the reciprocation action, while the diaphragm piston assembly 20 makes its upward movement from its lower dead point, the suction check valve 50*a* is kept closed and the discharge check valve 50*b* opens to discharge the air out of the pump chamber $R_1$ through exhaust port 12*b*. While the diaphragm piston assembly 20 moves downwardly from its upper dead point, the suction check valve 50*a* opens to lead the air from the vacuum brake booster into the pump chamber $R_1$ through inlet port 12*a* and the discharge check valve 50*b* is kept closed. Thus, the reciprocation of the diaphragm piston assembly 20 creates a negative or vacuum pressure in the pump chamber $R_1$ to be applied to the vacuum brake booster. During the reciprocation of the diaphragm piston assembly 20, lubricating oil is supplied into the axial oil passage 43 in cam shaft 40 from the source of lubricating oil by means of an oil pump (not shown) driven by the engine. The lubricating oil discharges out of the radial oil passage 44 by a centrifugal force and is received by the trough 34 of rocker arm 30 through the opening 35. Subsequently, the lubricating oil is stored in the well 33 of rocker arm 30 and flows through the lower oil passage 11*h* to be stored in the lower oil well 11*$g_2$*. Owing to suction during upward movement of diaphragm piston assembly 20 and pick up action of the rocker arm 30, the lubricating oil in well 33 is supplied to the bottom of upper guide assembly 15 and further supplied to the upper face of guide assembly 15 through vertical passage 11*e*. This ensures sufficient lubrication of a sliding portion between the upper guide assembly 15 and the operation rod 22. The lubricating oil in well 11*$g_2$* is supplied to the bottom face of lower guide assembly 17 to ensure sufficient lubrication of a sliding portion between the lower guide assembly 17 and the operation rod 22. Finally, the lubricating oil returns into the source of lubricating oil through an outlet passage in the bottom of the cylinder head $C_1$.

From the above description, it will be understood that the upper and lower guide assemblies 15 and 17 are provided to restrict movement of the operation rod 22 in its axial direction to thereby effect reciprocation of the diaphragm member 21 without causing any irregular deformation. Furthermore, it is able to reduce wear and seizure between the outer periphery of operation rod 22 and the upper inner bush 15*b* and between the cylindrical portion 23*a* of support sleeve 23 and the lower inner bush 17*b* because a radial force acting on the operation rod 22 is received by both the upper and lower guide assemblies 15 and 17. It is further noted that the fork portion 30*b* of rocker arm 30 is radially slidable on the annular flange 23*a* of support sleeve 23 to absorb the radial force acting on the operation rod 22. This results in further reduction of wear and seizure at the slinding portions of operation rod 22.

Figure 4:
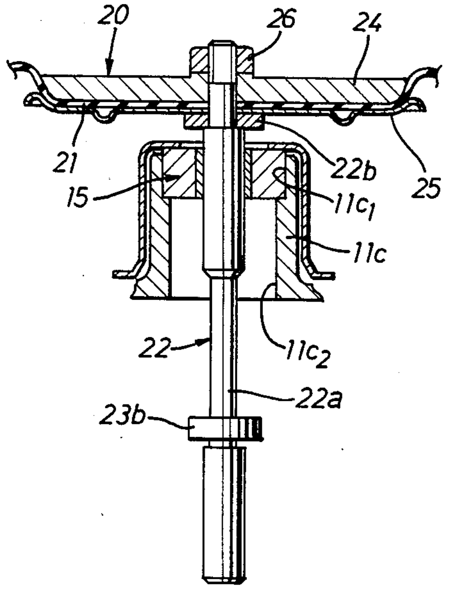
FIG. 4 is a partly sectional view of a modification of the diaphragm vacuum pump shown in FIG. 1.

In the above construction, it is to be noted that the upper guide assembly 15 is coupled within the stepped bore of cylindrical portion 11*c*, and the diameter of annular flange 23*b* of support sleeve 23 is smaller than the inner diameter of cylindrical portion 11*c*. With this arrangement, the diaphragm piston assembly 20 can be assembled in an easy manner within the lower housing section 11 and removed therefrom. Although in the above embodiment the annular flange 22*b* is formed in a piece with the operation rod 22, it may be provided as a separate piece as shown in FIG. 4. In such an arrangement, the annular flange 23*b* may be formed as one piece with the lower portion 22*a* of operation rod 22 because the annular flange 22*b* and the upper guide assembly 15 can be assembled with the operation rod 22 and removed therefrom. Furthermore, it is to be noted that the present invention may be adapted to a diaphragm fuel pump or the like.

Although certain specific embodiments of the invention have been shown and described, it is obvious that many modifications thereof are possible. The invention is, therefore, not intended to be restricted to the exact showing of the drawings and description thereof, but is considered to include reasonable and obvious equivalents.

What is claimed is:

1. A diaphragm fluid pump, comprising:

a housing assembly including a lower housing section for forming a lubricating oil chamber therein and an upper housing section coupled with said lower housing section and provided thereon with inlet and exhaust ports;

a diaphragm piston assembly including a diaphragm member clamped in a fluid-tight manner at the outer periphery thereof between said housing sections to form a pump chamber in said upper housing section, and an operation rod connected at the upper end thereof with the center of said diaphragm member;

valve means assembled within said upper housing section and including a first check valve to permit fluid flow into said pump chamber through said inlet port and a second check valve to permit fluid flow discharged from said pump chamber through said exhaust port; and a rocker arm pivoted on a portion of said lower housing section and driven by a drive shaft to swing in a vertical direction, said rocker arm having a swingable end connected with said operation rod to reciprocate said diaphragm piston assembly in an axial direction;

said diaphragm fluid pump further comprising a pair of axially spaced upper and lower guide assemblies mounted within said lower housing section for slidably supporting said operation rod in its axial direction, and a support sleeve rotatably mounted on the lower end portion of said operation rod and slidably supported by said lower guide assembly, said support sleeve being formed with an annular flange for receiving thereon the swingable end of said rocker arm.

2. A diaphragm fluid pump as claimed in claim 1, wherein said lower guide assembly comprises a guide means fixedly coupled within a vertical stepped bore in a bottom portion of said lower housing section for slidably supporting said support sleeve in its axial direction.

3. A diaphragm fluid pump as claimed in claim 2, wherein said guide means further comprises an outer annular bush fixedly coupled within said vertical stepped bore, and an inner annular bush fixedly coupled within said outer annular bush for slidably supporting said support sleeve in its axial direction.

4. A diaphragm fluid pump as claimed in claim 2, wherein said vertical stepped bore in the bottom portion of said lower housing section includes a large diameter part in which said guide means is coupled and a small diameter part in which the lower end of said support sleeve is exposed, the smaller diameter part of said bore forming an oil well to store therein an amount of lubricating oil.

5. A diaphragm fluid pump as claimed in claim 4, wherein the bottom wall of said lower housing section is formed therein with an oil passage leading the small diameter part of said bore into the lubricating oil chamber in said lower housing section.

6. A diaphragm fluid pump as claimed in claim 1, wherein said drive shaft for said rocker arm is integrally provided thereon with an accentric cam in engagement with said rocker arm for effecting reciprocation of said diaphragm piston assembly, said drive shaft being provided therein with an axial passage leading to a source of lubricating oil, and said eccestric cam being provided therein with a radial passage in communication with said axial passage for discharging the lubricating oil into the lubricating oil chamber in said lower housing section.

7. A diaphragm fluid pump as claimed in claim 6, wherein said rocker arm is formed therein with a trough and an opening leading therethrough the lubricating oil discharged from said radial passage into said trough.

8. A diaphragm fluid pump as claimed in claim 7, wherein said trough in said rocker arm is formed as an oil well for storing therein an amount of lubricating oil.

9. A diaphragm fluid pump comprising a housing assembly including a lower housing section for forming a lubricating oil chamber therein and an upper housing section coupled with said lower housing section and provided thereon with inlet and exhaust ports; and a diaphragm piston assembly including a diaphragm member secured in a fluid-tight manner at the outer periphery thereof to said housing assembly to form a pump chamber in said upper housing section, and an operation rod connected at the upper end thereof with the center of said diaphragm member; valve means assembled within said upper housing section and including a suction check valve to permit fluid flow sucked into said pump chamber through said inlet port and a discharge check valve to permit fluid flow discharged from said pump chamber through said exhaust port; and a rocker arm pivoted on a portion of said lower housing section and driven by a drive shaft to swing in a vertical direction, said rocker arm having a swingable end connected with said operation rod to reciprocate said diaphragm piston assembly in an axial direction;

said diaphragm fluid pump further comprising a pair of axially spaced upper and lower guide assemblies mounted within said lower housing section for slidably supporting said operation rod in its axial direction; and a flange formed in a piece with the lower portion of said operation rod and located above said lower guide assembly for receiving thereon the swingable end of said rocker arm;

wherein said lower guide assembly comprises a guide means fixedly coupled within a vertical stepped bore in a bottom portion of said lower housing section for slidably supporting the lower portion of said operation rod in its axial direction; and wherein said vertical stepped bore includes a large diameter part in which said guide means is coupled and a small diameter part in which the lower end of said operation rod is exposed, the small diameter part of said bore forming an oil well to store therein an amount of lubricating oil.

10. A diaphragm fluid pump as claimed in claim 9, wherein the swingable end of said rocker arm is formed with a fork portion coupled with the lower portion of said operation rod and radially slidable on said flange of said operation rod.

* * * * *